United States Patent [19]

Harris

[11] Patent Number: 5,227,970
[45] Date of Patent: Jul. 13, 1993

[54] METHODS AND SYSTEMS FOR UPDATING GROUP MAILING LISTS

[75] Inventor: William K. Harris, Weston, Conn.

[73] Assignee: Bernard C. Harris Publishing, White Plains, N.Y.

[21] Appl. No.: 549,386

[22] Filed: Jul. 6, 1990

[51] Int. Cl.$^5$ .............................................. G06F 15/21
[52] U.S. Cl. .................................. 364/419; 364/401; 364/464.01
[58] Field of Search ............ 364/400, 401, 478, 464.01, 364/464.02, 464.03

[56] References Cited

U.S. PATENT DOCUMENTS

| | | | |
|---|---|---|---|
| 4,853,852 | 8/1989 | Rosen | 364/401 |
| 4,853,882 | 8/1989 | Marshall | 364/570 |
| 4,868,757 | 9/1989 | Gill | 364/464.03 |
| 4,959,600 | 9/1990 | DiGiulio et al. | 318/625 |
| 5,111,395 | 5/1992 | Smith et al. | 364/408 |

Primary Examiner—Roy N. Envall, Jr.
Assistant Examiner—A. Bodendorf
Attorney, Agent, or Firm—Brumbaugh, Graves, Donohue & Raymond

[57] ABSTRACT

A mailing list for an associated group of individuals, such as graduates of a college, is updated by requesting information on lost individuals from individuals with known addresses. Results are optimized by automated compiling of customized listings of lost individuals based on analysis of commonality of personal data items (such as class year and membership) between lost individuals and individuals with known addresses. Responses from recipients of the customized listings are used to update mailing list addresses.

14 Claims, 2 Drawing Sheets

METHODS AND SYSTEMS FOR UPDATING GROUP MAILING LISTS

This invention relates to the updating of mailing lists maintained for associated groups of individuals. It has particular application in relation to individuals associated as graduates of a school or college, about whom a variety of items of personal data (such as graduation class and organization memberships) may be known even though current addresses may be unknown.

BACKGROUND OF THE INVENTION

For many purposes it is desirable for an organization to maintain an active mailing list of current and former members, participants or graduates. As members move, marry, etc., some typically become "lost". Different efforts may be undertaken to find current addresses for such lost members. For example, in connection with school or college alumni and alumnae reunions, a reunion committee may send out a mailing that includes a "lost" list. However, these efforts are typically constrained within a single graduating class and the whole list, which may be quite lengthy, is simply sent to each recipient. In the past there has been no practical way to either tailor the lists, or to use the opportunity to also seek information on lost members of other graduating classes. In other circumstances mailings may be sent out to request individual information about the recipient, as part of an alumni/alumnae directory publication project, for example. Again, there has been no practical or economical way to derive a listing of a desired number of relevant lost alumni about whom the mailing recipient would be likely to have information.

Thus, while an associated group of individuals may have available a variety of items of personal data on former members and may even send mailings to active members, there has been no practicable way to use such data to effectively gather information and update mailing lists on an automated basis.

It is therefore an object of this invention to provide methods and systems for analyzing and utilizing available information to enhance the collection of information and updating of mailing lists on an automated and cost effective basis.

It is a further object to provide such methods and systems wherein individuals with known addresses can be sent requests for information including a listing of a predetermined number of lost individuals selected in view of commonality of personal data items.

It is a still further object to provide such methods and systems wherein subsequent mailings to individual recipients include listing of lost individuals not included on prior lists, who may be selected on the basis of data item commonality criteria different from the first mailing.

SUMMARY OF THE INVENTION

In accordance with the invention, a method for updating a mailing list for an associated group includes the steps of providing a first list of individuals with known addresses (including information on one or more additional personal data items), providing a lost list of individuals with unknown addresses (including information on one or more personal data items in common with the first list), selecting one or more personal data items as representative of commonality between individuals, and specifying a maximum number of second list individuals to be identified for a first list individual. The method further includes analyzing commonality between the first and lost lists based on all or some of the selected items and compiling for each desired first list individual a customized listing of lost list individuals, based on commonality of one or more personal data items. Further steps may include preparing copies of customized listings, distributing customized listing copies to respective first list individuals with a request for information relating to lost list individuals listed, receiving and processing responses to distributed requests, updating the first and lost lists to enter current addresses and reclassify former lost list individuals with new addresses to the first list and preparing a copy of an updated listing of all individuals with known addresses.

Also in accordance with the invention, a method for repeated updating of a mailing list for an associated group includes the steps of (a) implementing the basic method for a first distribution of information requests, and (b) implementing the basic method again with a selection of one or more personal data items different from personal data items selected in step (a), with the additional step of excluding from the customized listing for a first list individual all lost list individuals included in the preceding customized listing for the same first list individual. In this way, the customized listings distributed to specific first list individuals will include different second list individuals on successive information requests.

Further in accordance with the invention, a system for providing updated mailing lists for an associated group includes data file means, including means for storing a first list of individuals with known addresses and a lost list of individuals with unknown addresses, with the stored data also including information on one or more additional personal data items and on the known or unknown address status of individuals. The system also includes data entry means for entering selection data representing P items of personal data (where P is 1 or a higher integer) representative of commonality between individuals and for entering address update data and other data as available, data processing means for analyzing first and lost lists on the basis of commonality of all or some of said P items of personal data for compiling for each desired first list individual a customized listing of lost list individuals having one or more personal data items in common and means for preparing representations of customized listings for distribution to respective first list individuals with requests for updated information relating to lost list individuals.

For a better understanding of the present invention, together with other and further objects, reference is made to the following description, taken in accordance with the accompanying drawings, and its scope will be pointed out in the appended claims.

DESCRIPTION OF THE INVENTION

Figure 1:
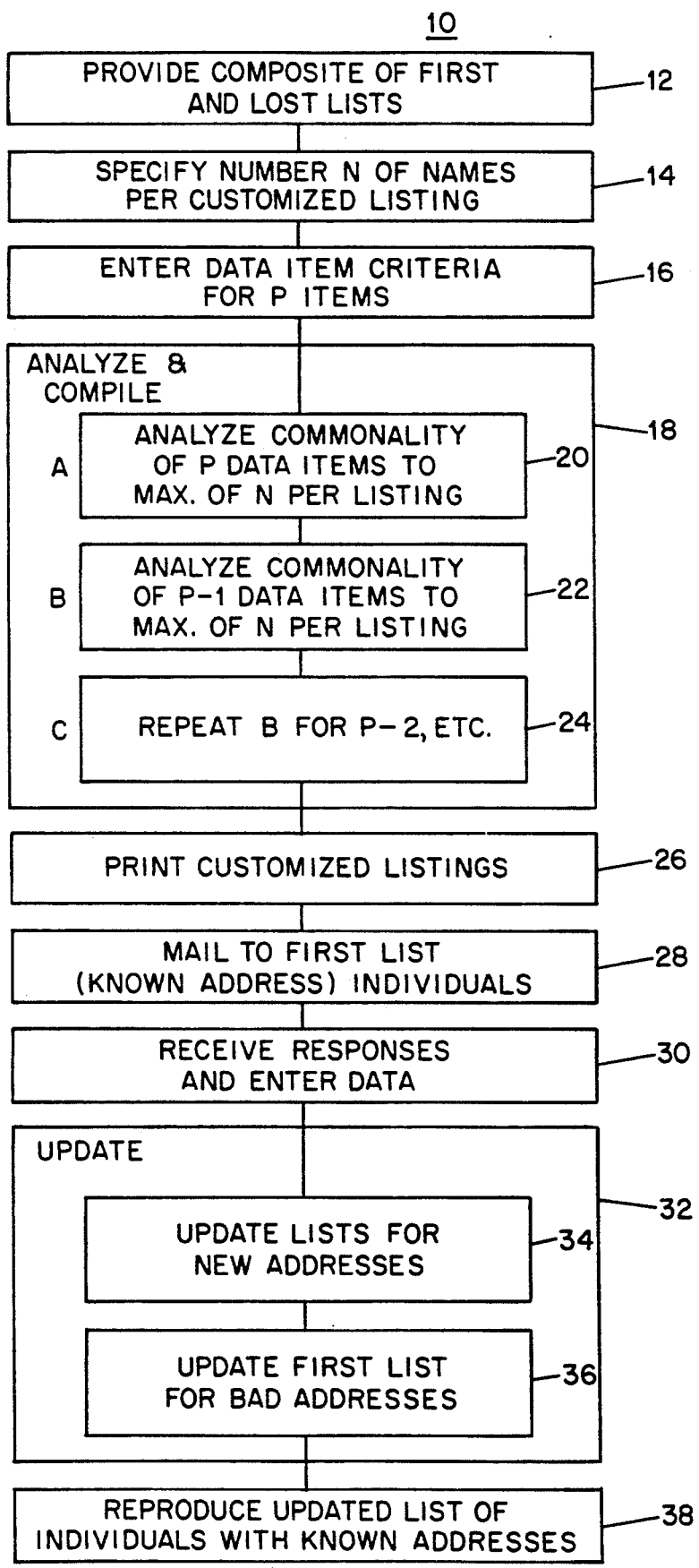
FIG. 1 is a flow chart for updating a mailing list for an associated group of individuals.

As illustrated in FIG. 1, a method 10 for updating a mailing list for an associated group of individuals, such as graduates of a school or college, includes a step 12 of providing a first list of individuals with known addresses and a second list of individuals whose current addresses are unknown (i.e., "lost" individuals). As indicated, in this example the first and lost lists are provided as a single composite list, with all names listed in alphabetical or other identified order and including coding information identifying respective individuals as either having a known or unknown address.

The composite list also includes information on personal data items as available for each individual on both the first and lost lists comprising the composite list. The personal data items to be represented can include one or more of: class or year of graduation; clubs, fraternity or sorority; sport team membership; field of study; former zip code; etc. Each individual's entry, including personal data items and any other desired information, can be entered into data files in a computer based storage medium with appropriate format and encoding as may be determined to be desirable in the experience of persons skilled in the art of data storage and retrieval. In particular, encoding should be such as to enable retrieval based on specific data item equivalency, such as year of graduation, or ranges of commonality, so as to cover a year of graduation as well as graduates in the preceding and following classes, for example.

As shown in FIG. 1, the next step 14 covers the specifying of the number "N" of names of lost individuals to be included in the information request or questionnaire packet ("QP") to be mailed to each individual on the first list of known address individuals. Using data entry devices to enter the information, judgment can be applied to choose a list including enough lost individuals to be meaningful, but not an excessive number. For example, the listing of lost individuals may be specified as totalling 83, permitting a single column listing in readable type size on a sheet of standard size paper.

As illustrated, the next step 16 covers the selection of the specific items of personal data to be used to represent commonality in the selection of a listing of lost individuals customized for the intended recipient. For example, it could be determined that each first list member of an alumni group will be sent a QP including a listing of lost members of the same graduating class, but that if that class had too low a number of lost members then lost members of the preceding class would be listed. In this example, if the class of 1980 had 200 lost alumni: the first listing would include the first 83 lost alumni; the second listing would include lost alumni Nos. 84-166; the third listing would include Nos. 167-200 and 1-49; the fourth 50-132; etc.; on a rotating basis, to provide a listing of 83 names for each first list alumnus. If, however, the class of 1988 turned out to have only 53 lost alumni, the listings of lost alumni would always include those 53 lost alumni, to which could be added a list of 30 lost alumni from the class of 1987 (or the class of 1989, etc.), selected on a rotating basis in the same manner as discussed for the class of 1980.

In other applications, it might be desirable to select two or more personal data items (i.e., a total of "P" items) for use in commonality determinations. For example, if P equals three, the data items selected could be graduating class, plus scholastic major, plus sports team. In this case the objective would be to mail to each known-address alumnus who graduated in a specific year and who had a specific major and played a specific sport, only names of lost alumni who had all of these three items in common. In this way a 1980 engineering graduate who had been on the track team would receive a listing of other 1980 engineering graduate track team members. Many variations will be apparent and will be discussed further below.

The next step 18 as shown in FIG. 1 encompasses the data-processing based analysis of commonality between the first and lost lists based on the selected personal data items in order to compile a customized listing of lost individuals for each desired first list individual. As shown in FIG. 1, the analysis and compiling to be carried out in widely available types of computer equipment may comprise a series of steps. For the three data item example discussed above, step 20 analyzes the lost list on the basis of all three data items for each alumnus on the first list. Thus, for each 1980/engineering/track graduate with a known address there will be compiled a listing of all lost 1980/engineering/track graduates, and similarly for 1980/English major/tennis team graduates, if desired.

Step 18 as shown in FIG. 1 also includes step 22 wherein the analysis is repeated in order to fill out the listing for each first list individual whose listing of lost alumni failed in step 20 to reach a full complement of 83 names in this example. Thus, if in step 20, for a specific first list 1980/engineering/track graduate only five lost 1980/engineering/track alumni are on the lost list, the analysis process can be repeated in step 22 using not the entire P data items (P equals three in this example), but $P-1$ or the first two data items, i.e.—1980/engineering, to compete a composite list of up to 83 lost members with at least these two data items in common, with provision for excluding repetitions of the same name. Similarly, if step 20 and 22 still fail to produce a listing of a full 83 names, that full quota could be filled out for $P-2$ data items, i.e.—only the first criteria of membership in the class of 1980. Numerous variations of how to specify the commonality analysis on the selected personal data items will be evident in specific applications once there is an understanding of the present invention.

Referring to FIG. 1, there are shown additional steps in accomplishing the updating of a mailing list in accordance with the invention. In step 26 the customized listing of lost individuals is produced in printed or other form for distribution to each of the respective first list individuals for whom the listings were prepared. In step 28 the customized listings are distributed by mailing or faxing hard copies, electronic distribution, or other means as desired. This distribution will include a request for information available to the recipient regarding the address and other data on any one or more of the listed lost individuals and may also request a review of personal data on the recipient with respect to publication of an alumni directory, for example. Also, for subsequent processing of information, each recipient and lost individual is desirably assigned an identification code number, printed numerically, as a bar code, or in other desired form.

Further as shown in FIG. 1, in step 30 after receipt of responses from first list recipients, information is reviewed and entered into data storage for updating applications in step 32. In FIG. 1, step 32 includes step 4 wherein the composite list is updated to enter current addresses and reclassify former lost individuals to known address status in the first list. Similarly, in step 36, if in the distribution of QPs to the first list individuals some of their addresses are found to no longer be accurate, the composite list can be updated to reclassify these individuals from the first list to the lost list. At this point corrected information which becomes available from any other source can also be used to update the composite list, so that an updated list of all individuals having accurate addresses can be produced in electronic form, in the form of mailing labels, as a directory, etc., for delivery to the organization involved, use in a mailing, or other desired end use.

On an overall basis, there have now been described flexible mailing list updating methods and systems which use automated data processing and analysis to take advantage of personal data items available within the present and past membership of an associated group in producing customized listings of lost individuals which can be significantly optimized so that a recipient is requested to provide information on the very individuals on whom he is most likely to have useful information. An additional aspect of the invention is that for subsequent mailings the invention permits additional optimization of the updating process through the avoidance of repetitive inclusion of the same lost individuals in the QP sent to a given recipient.

Figure 2:
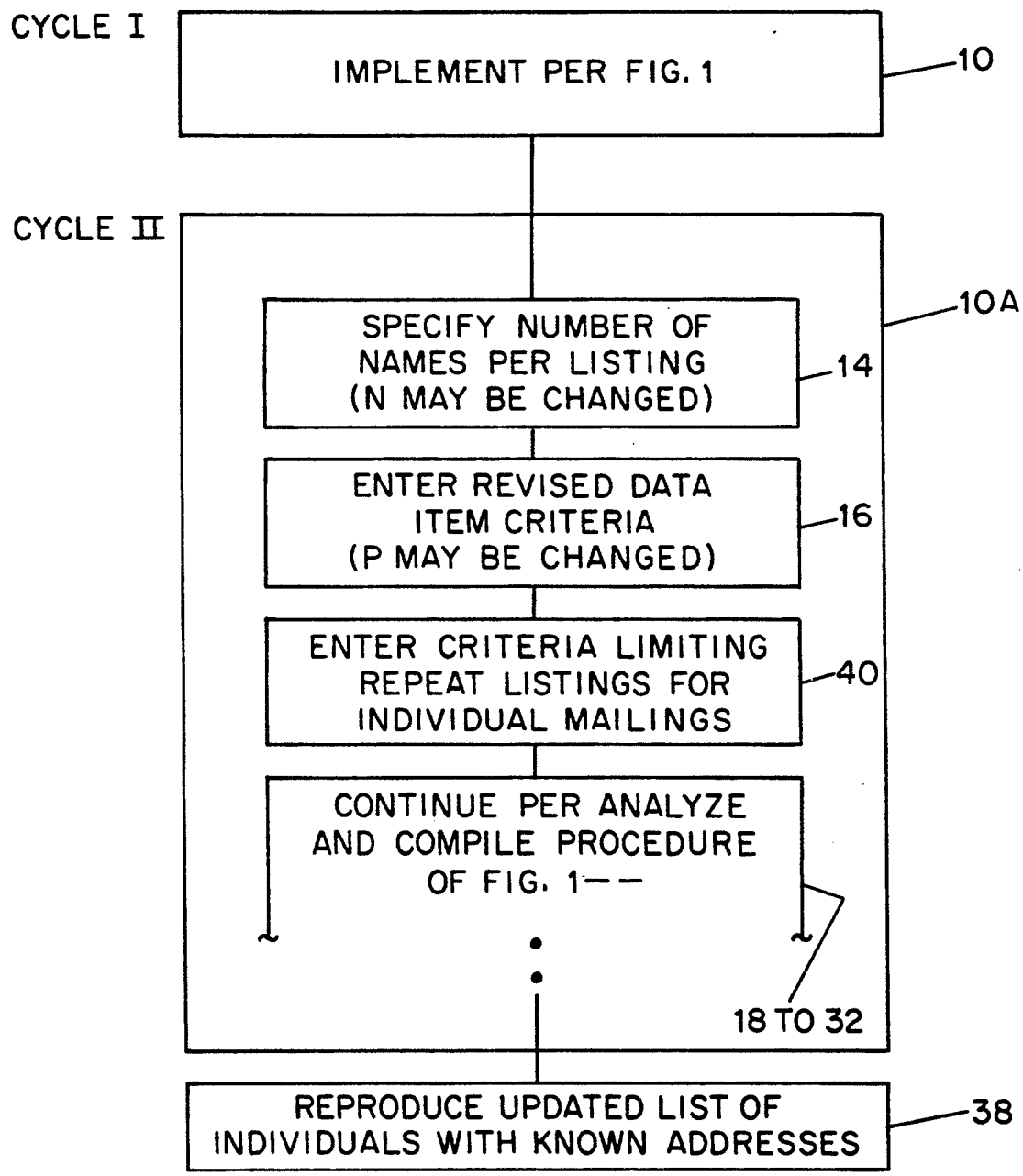
FIG. 2 is a flow chart for updating a mailing list with repeated requests for information.

FIG. 2 illustrates use of the invention in updating a mailing list where the opportunity exists for sending repeated requests for information to alumni or members of a group whose addresses are known. As shown in FIG. 2, in Cycle I all or so much as is desired of the FIG. 1 method and system is carried out. Then, when there is an opportunity for a subsequent mailing, Cycle II as shown in FIG. 2 is implemented.

In Cycle II, shown as 10A in FIG. 2, steps 14 and 16 correspond to the similarly numbered steps in FIG. 1. Accordingly, the number of lost names to be included in each customized listing, and the data items selected for commonality analysis, can each be left as in Cycle I or revised. For example, for a class with a large number of lost individuals it may be desirable in the previous example to leave the 1980 class designation unchanged, but designate a club or fraternity membership commonality in place of the field of study designation previously used. Then, in step 40, criteria may be entered to control the compiling of the listings so as to exclude from the listing compiled for each individual QP recipient all lost individuals who were included in a prior QP listing sent to that individual recipient. Depending on numbers of individuals on the lost list relative to the first list of known addresses, it may be desirable to permit repeated listings of lost individuals up to half of the content of the new listing, or some other fraction. It should be noted that these variations are in addition to the flexibility available through the use of changed data item designations to cause the listing for the repeated mailing to include lost members of the class of 1981 for up to half of the content of the new listing to be sent to members of the class of 1980, or include members of the classes of 1979 and 1981 for up to one-quarter of the content each, for example. Once these determinations are made in view of the particular circumstances and objectives, as indicated in FIG. 2 the remaining steps 18 through 38 as discussed with reference to FIG. 1 are implemented as desired.

The invention readily enables personal data items to be used on an automated basis to permit a recipient to be asked for information considering specific lost individuals about whom the recipient is most likely to have information. In the examples discussed, the invention was used in compiling a listing of a column of 83 lost individuals for each recipient. In other applications it may be more effective to provide a shorter list, more focused through use of a larger number of data items in determining commonality. By providing a list of say ten lost individuals, recipients may possibly be urged to a higher level of effort in finding current addresses. Other efforts such as inquiries based on social security numbers and telephone directly reviews, for example, may be used in conjunction with the invention to separately provide additional information which can be included in the data base and for updating mailing lists.

While there have been described what are believed to be the preferred embodiments of the invention, those skilled in the art will recognize that other and further modifications may be made thereto without departing from the invention and it is, therefore, intended to cover all such modifications as fall within the true scope of the invention.

I claim:

1. A method for updated a data base comprising a mailing list for an associated group, comprising:
   providing in said data base a first list of individuals with known addresses, including one or more personal data items associated with each individual in the first list and containing data associated with said individual;
   providing in said data base a lost list of individuals with unknown addresses, including personal data items, corresponding to said one or more personal data items, and associated with each individual in the lost list;
   selecting one or more of said personal data items for correlation;
   correlating said first list and said lost list on the basis of said selected items and compiling, for each first list individual having associated selected personal data items in common with lost list individuals, a customized listing of said lost list individuals;
   distributing said customized lists to selected ones of said first list individuals with requests for information on lost individuals; and
   updating said first list on the basis of responses received.

2. A method for updating a mailing list as in claim 1, additionally comprising specifying a maximum number of lost list individuals to be identified for each first list individuals, before analyzing commonality and compiling said customized listings.

3. A method for updating a mailing list as in claim 1, wherein said first and lost lists are provided as a single composite interspersed list including information identifying individuals as to known or unknown address status.

4. A method for repeated updating of a mailing list for an associated group, comprising:
   (a) implementing the method of claim 1 for a first distribution of information requests; and
   (b) implementing the method of claim 1 with a selection of one or more personal data items different from said personal data items selected in step (a), for a successive distribution of information requests;
   whereby, the customized listings distributed to specific first list individuals will include different second list individuals on successive information requests.

5. A method for repeated updating of a mailing list for an associated group, comprising:
   (a) implementing the method of claim 1 for a first distribution of information requests; and (b) implementing the method of claim 1 with the additional step of excluding from the customized listing for a first list individual all lost list individuals included in the preceding customized listing for the same first list individual;

whereby the customized listings distributed to specific first list individuals will include different second list individuals on successive information requests.

6. A method for updated a data base comprising a mailing list for an associated group, comprising:

providing in said data base a first list of individuals with known addresses, including one or more personal data items associated with each individual in the first list and containing data associated with said individual;

providing in said data base a lost list of individuals with unknown addresses, including personal data items, corresponding to said one or more personal data items, and associated with each individual in the lost list;

selecting one or more of said personal data items for correlation;

specifying a maximum number of lost list individuals to be identified for a first list indiviudal;

correlating said first list and said lost list on the basis of said selected items and compiling, for each first list individual having associated selected personal data items in common with lost list individuals, a customized listing of said lost list individuals;

preparing copies of said customized listings, including identification code designations for first and lost list individuals;

distributing said customized listing copies to selected ones of said first list individuals, with requests for information relating to lost list individuals listed;

receiving and processing responses to said distributed requests;

updating said first and lost lists to enter current addresses and reclassify former lost list individuals with new addresses to said first list; and preparing a copy of an updated listing of all individuals with known addresses.

7. A method for updating a mailing list as in claim 6, wherein said first and lost lists are provided as a single composite interspersed list including information identifying individuals as to known or unknown address status.

8. A method for updating a mailing list as in claim 6, additionally comprising updating said first and lost lists to reclassify former first list individuals with deficient addresses to said lost list, before preparing a copy of the updated listing of all individuals with known addresses.

9. A method for repeated updating of a mailing list for an associated group, comprising:
(a) implementing the method of claim 6 for a first distribution of information requests; and
(b) implementing the method of claim 6 with a selection of one or more personal data items different from said personal data items selected in step (a), for a successive distribution of information requests;
whereby the customized listings distributed to specific first list individuals will include different second list individuals on successive information requests.

10. A method for repeated updating of a mailing list for an associated group, comprising:
(a) implementing the method of claim 6 for a first distribution of information requests; and
(b) implementing the method of claim 6 with the additional step of excluding from the customized listing for a first list individual lost list individuals included in the preceding customized listing for the same first list individual;
whereby the customized listings distributed to specific first list individuals will include different second list individuals on successive information requests.

11. A method for repeated updating of a mailing list for an associated group, comprising:
(a) implementing the method of claim 6 for a first distribution of information requests; and
(b) implementing the method of claim 6 with a selection of one or more personal data items different from said personal data items selected in step (a), and with the additional step of excluding from the customized listing for a first list individual all lost list individuals included in the preceding customized listing for the same first list individual;
whereby, the customized listings distributed to specific first list individuals will include different second list individuals on successive information requests.

12. A system for providing updated mailing lists for an associated group, comprising:
data file means including means for storing a first list of individuals with known addresses and a lost list of individuals with unknown addresses, said stored data also including one or more personal data items containing data associated with said individual and data on the known or unknown address status;
data entry means for entering a selection of P personal data items containing particular data, where P is 1 or a higher integer, and for entering address update data and other data as available;
data processing means for correlating said first list and said lost list on the basis of selected ones of said P personal data items containing particular data for compiling, for each first list individual having associated selected ones of said P personal data items in common with lost list individuals, a customized listing of said lost list individuals; and
means responsive to said data processing means for preparing representations of said customized listings for distribution to respective first list individuals with requests for updated information relating to lost list individuals.

13. A system for providing updated mailing lists as in claim 12, wherein said data processing means is controlled to first perform said correlation on the basis of all of said P items and successively repeat said correlation on the basis of $P-1$, $P-2$, down to $P-x$ of said P items so long as $P-x$ is a positive integer, and to terminate said repetitive correlation for a particular customized listing when the number of lost list individuals included equals a predetermined total.

14. A system for providing updated mailing lists as in claim 12, additionally comprising means for preparing copies of an updated list of all individuals with known current addresses.

* * * * *